United States Patent Office 3,277,623
Patented Oct. 11, 1966

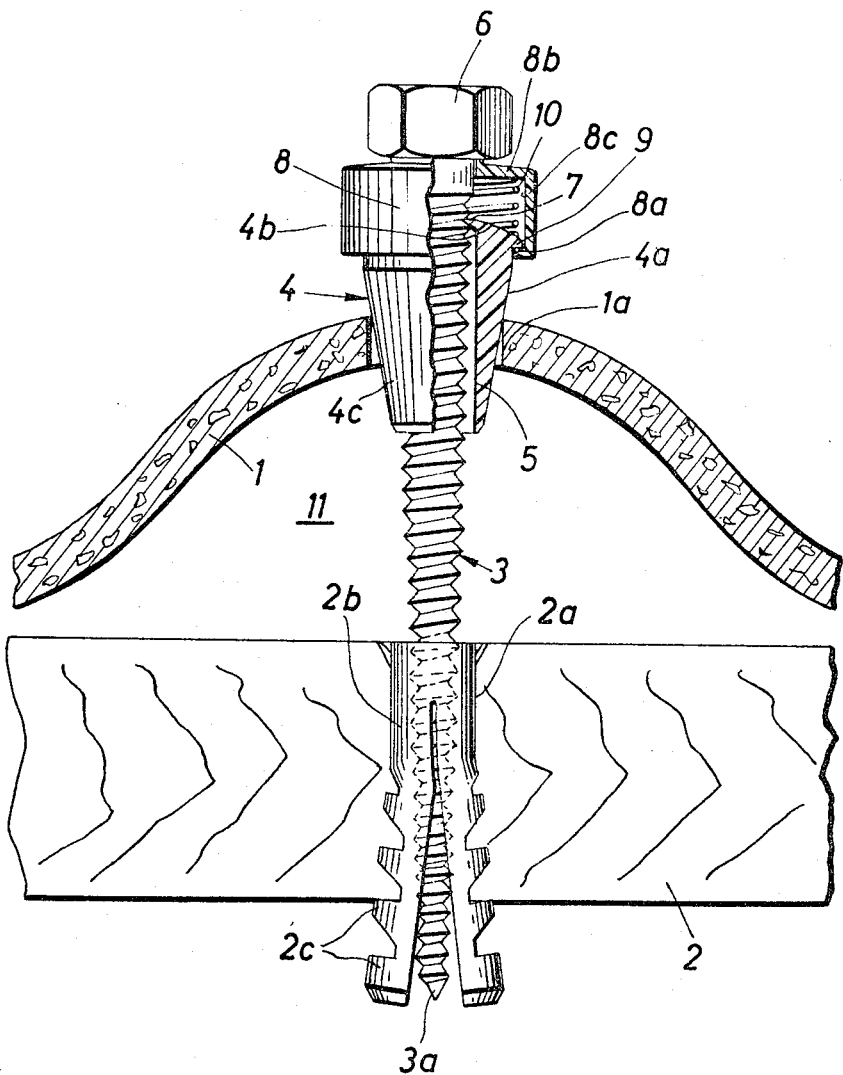

3,277,623
ANCHORING ARRANGEMENT
Artur Fischer, Tumlingen, Kreis Freudenstadt, Germany
Filed Nov. 15, 1962, Ser. No. 237,984
5 Claims. (Cl. 52—403)

The present invention relates to anchoring arrangements in general, and more particularly to an anchoring arrangement which is especially suited for connecting apertured plates of asbestos cement or the like to roofs or similar supporting structures. Still more particularly, the invention relates to an anchoring arrangement which, in addition to securing a supported element to a supporting structure, also forms a fluidtight seal between one or more of its component parts and the supported element.

In conventional anchoring arrangements of which I am aware at this time, the sealing connection between the component parts of the anchoring arrangement and the supported element often depends on variations in temperature. For example, when the sealing component or components of such anchoring arrangements are caused to shrink, moisture is likely to penetrate through the apertured element to attack the spring or springs which are normally employed to compensate for shrinkage. Furthermore, such known anchoring arrangements can be utilized only with certain types of apertured elements whose apertures must be machined with great precision to insure that the sealing action of the anchoring arrangement remains satisfactory for longer periods of time. Still further, known anchoring arrangements cannot compensate for changes in the position of a supported element with respect to the supporting structure such as develop when the supported element is a corrugated plate or the like which may be deformed to move nearer to or further away from the supporting structure.

Accordingly, it is an important object of the present invention to provide a very simple and inexpensive anchoring arrangement which is constructed and assembled in such a way that it seals the aperture of a supported element regardless of changes in temperature and regardless of whether or not the supported element changes its position with respect to the supporting structure.

Another object of the invention is to provide an anchoring arrangement of the just outlined characteristics which may be utilized with equal advantage for securing different types of supported elements, i.e., for securing elements which are formed with larger or smaller apertures for the passage of one or more component parts of the anchoring arrangement.

A further object of the invention is to provide a novel sealing member for use in anchoring arrangements of the above outlined characteristics.

An additional object of the invention is to provide an anchoring arrangement which can be readily detached from a supporting structure without any damage to its component parts so that it may be reused as often as desired.

A concomitant object of the instant invention is to provide an anchoring arrangement wherein a single sealing member is sufficient to provide a tight seal with the supported element and with one or more component parts of the anchoring arrangement to thereby prevent penetration of fluid matter through the aperture of the supported element.

With the above objects in view, the invention resides in the provision of an anchoring arrangement which is especially suited for connecting a rather thin-walled supported element (such as an apertured corrugated plate consisting of asbestos cement or synthetic plastic) to a supporting structure, e.g., to a masonry wall consisting of bricks, concrete, plaster or another comparatively brittle material which is not likely to take a screw, a bolt or a similar externally threaded member.

The anchoring arrangement comprises an elongated screw bolt or a similar externally threaded anchoring member having a first end portion insertable through the aperture of the supported element and adapted to be driven into the supporting structure, and an enlarged second end portion or head which is outwardly adjacent to the supported element when the first end portion of the anchoring member is driven into the supporting structure, and a preferably elastic tubular sealing member which surrounds the anchoring member intermediate the end portions thereof. This sealing member has a larger-diameter portion which is nearer to the second end portion of the anchoring member and whose diameter is greater than the diameter of the aperture (e.g., a through bore) of the supported element so that, when the first end portion of the anchoring member is driven into the supporting structure to such an extent that the second end portion thereof transmits pressure to the larger-diameter portion of the sealing member, the latter is biased into sealing engagement with and seals the aperture of the supported element.

The novel features which are considered as characteristic of the invention are set forth in particular in the appended claims. The invention itself, however, both as to its construction and its method of operation, together with additional objects and advantages thereof, will be best understood from the following detailed description of a specific embodiment with reference to the accompanying drawing the single illustration of which is a partly elevational and partly sectional view of an anchoring arrangement embodying my invention, the parts of this anchoring arrangement being utilized for connecting a supported element in the form of a corrugated plate consisting of asbestos cement to a supporting structure, such as a comparatively brittle masonry wall or roof of a building or the like.

Referring now in greater detail to the drawing, there is shown a supported element in the form of a comparatively thin-walled corrugated plate 1 consisting of asbestos cement, and a supporting structure 2, e.g., a comparatively brittle wall made of brick or a similar material which, as a rule, cannot retain a threaded member with great force. The means for connecting the element 1 to the supporting structure 2 comprises an anchoring arrangement including an elongated externally threaded anchoring member 3 here shown as a screw bolt having a first end portion 3a which is inserted through the aperture 1a of the supported element 1 and which is driven into the supporting structure 2, and an enlarged second end portion or head 6 which is outwardly adjacent to the element 1 when the end portion 3a is driven home. The anchoring arrangement further comprises a tubular sealing member 4 having a conical outer face and including a smaller-diameter portion 4c which extends into the aperture 1a. The larger-diameter portion 4a of the sealing member is outwardly adjacent to and is biased into sealing engagement with the wall bounding the aperture 1a by a resilient element here shown as a helical expansion spring 10 which is accommodated in the internal chamber 8c of a sleeve 8 disposed about the anchoring member 3 between the head 6 and the larger-diameter portion 4a. The upper end convolution of the spring 10 abuts against an inwardly extending annular end wall 8b of the sleeve 8, and the lower end convolution of this spring abuts against the upper end face 4b of the larger-diameter portion 4a. The sealing member 4 surrounds the anchoring member 3 and is formed with a through bore 5 whose diameter is greater than the diameter of the stem of the anchoring member.

The larger-diameter portion 4a of the sealing member is formed with an annular inwardly extending sealing lip 7 which engages and provides a tight seal about the anchoring member 1 so that the member 4 may sealingly engage this anchoring member and also the wall bounding the aperture 1a. In the embodiment which is shown in the drawing, the aperture 1a assumes the form of a cylindrical through bore whose diameter is at least slightly smaller than the maximal diameter of the portion 4a, i.e., the sealing member cannot be forced through the supported element 1.

The sealing member 4 is connected with the sleeve 8 by means of a coupling which includes an external annular flange 9 on the larger-diameter portion 4a and an inwardly extending annular flange 8a at the lower end of the sleeve. It will be noted that the flange 9 comes into abutment with the flange 8a when the spring 10 is free to bias the sealing member 4 in a direction away from the head 6. The coupling 8a, 9 prevents separation of the parts 4, 8 under the bias of the spring 10.

The supporting structure 2 is formed with a through bore 2a which is aligned with the aperture 1a and which accommodates an expansible slotted sleeve 2b. This sleeve is provided with external teeth 2c which bite into the material of the supporting structure when the sleeve expands in response to penetration of the end portion 3a. The sleeve 2b insures that the end portion 3a is anchored in the supporting structure with great force such as is necessary to retain the element 1 in a position as shown in the drawing. It will be noted that the stem of the anchoring member 1 tapers in a direction away from the head 6 so that it may act as a wedge and will more readily expand the sleeve 2b.

I prefer to manufacture the sealing member 4 and the sleeves 8, 2b of tough, corrosion-resistant synthetic plastic material which is at least slightly elastic. The elasticity of the sealing member 4 is of advantage because this sealing member may be deformed in response to pressure transmitted thereto by the spring 10, and its conical outer face will then engage at least a substantial portion of the wall bounding the aperture 1a. Consequently, neither moisture nor air can penetrate through the aperture 1a once the end portion 3a of the anchoring member 3 is driven into the supporting structure 2 (i.e., into the slotted sleeve 2b) to such an extent that the head 6 compresses the spring 10 and that the latter transmits pressure from the head to the upper end face 4b of the larger-diameter portion 4a.

When the sealing member 4 is deformed and when its outer face engages the wall bounding the aperture 1a, the lips 7 are forced into sealing engagement with the stem of the anchoring member 1 to insure that any fluid which might have entered the internal chamber 8c of the sleeve 8 is prevented from penetrating into the bore 5 and thence into the space 11 between the inner side of the supported element 1 and the outer side of the supporting structure 1. Since the sealing member 4 preferably consists of elastically deformable material, the likelihood that the element 1 would develop fissures around its aperture 1a is very remote even if the anchoring member is driven home with substantial force. On the one hand, the formation of such fissures is prevented by the resiliency of the sealing member and, on the other hand, the spring 10 will yield to a predetermined pressure and will permit the flange 8a to move away from the flange 9 rather than to allow excessive compression of the sealing member.

If desired, the supported element 1 may consist of synthetic plastic material, of wood, or of any other substance which can be formed with an aperture and which can constitute a component part of a roof, of a wall covering or of another protective body about the supporting structure 2.

It will be readily understood that, owing to its conicity, the sealing member may be utilized in connection with apertured elements whose apertures are of different diameters as long as the diameters of such apertures are less than the maximal diameter of the larger-diameter portion 4a. I prefer to utilize comparatively weak sealing lips 7 so that these lips cannot displace the member 4 with respect to the apertured element 1 in response to axial displacements of the anchoring member 1. In other words, if it should happen that the anchoring member has some slight axial play, or if the sealing member shrinks in response to a drop in temperature, this should not prevent the conical outer face of the sealing member from forming a fluidtight seal with the wall of the aperture 1a.

Since the sealing member 4 and the sleeve 8 preferably consist of elastically deformable material, their flanges 9, 8a form a fluidtight seal whenever the spring 10 is free to bias the sealing member in a direction away from the head 6, that is to say, whenever the flanges 8a, 9 are in actual abutment with each other. The sealing member 4 preferably consists of synthetic material made e.g. of nylon, polyvinylchloride, polyethylene or polypropylene.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An anchoring arrangement, particularly for connecting a thin-walled element to a supporting structure comprising, in combination, an element including a thin-walled portion having an aperture of predetermined diameter; an elongated anchoring member having a diameter substantially smaller than the diameter of said aperture in said thin-walled portion so as to leave between itself and the wall surrounding said aperture an annular space, said anchoring member passing through said aperture and having a screw-threaded tip adapted to be screwed into a supporting structure so that one side of said thin-walled portion is adjacent to but remains spaced from said supporting structure with the rear end of said anchoring member located at the other side of said thin-walled portion; an elastically deformable tubular sealing member having an annular outer end face and surrounding with clearance a portion of said anchoring member adjacent said rear end thereof and having a conical outer face portion including a first portion having a diameter smaller than the diameter of said aperture and arranged to extend into said aperture and a second portion having a diameter larger than the diameter of said aperture and located at said other side of said thin-walled portion, said elastically deformable tubular sealing member having on its inner face an inwardly projecting annular lip sealingly engaging said elongated anchoring member; abutment means mounted on said rear end of said anchoring member; a cap-shaped sleeve having an opening surrounding said elongated anchoring member, said cap-shaped sleeve extending from said abutment means engaging the same in direction toward said tubular sealing member and having a free edge slidingly engaging the outer surface of said tubular sealing member movable along the same; and spring means arranged between said annular outer end face of said tubular sealing member and said cap-shaped sleeve permanently biasing said cap-shaped sleeve in direction toward said abutment means for urging said tubular sealing member into engagement with the wall surrounding said aperture so as to tightly seal the space within said aperture when said anchoring member is screwed into a supporting structure.

2. An anchoring arrangement according to claim 1, said sealing member having a thin flexible inwardlly extending sealing lip which engages said anchoring member to provide a seal between said members while simultaneously permitting at least some axial movement of one of said members relative to the other.

3. An anchoring arrangement according to claim 2, said elastically deformable sealing member sealingly engaging the apertured element and being radially inwardly compressed thereby when said first end portion is driven into the supporting structure to such an extent that said second end portion forces said sealing member axially against the apertured element whereby said inwardly extending lip sealingly engages said anchoring member in response to said radial compression of said sealing member.

4. An anchoring arrangement as set forth in claim 1, further comprising a sleeve surrounding said anchoring member and having an annular end wall abutting against said abutment means, said spring means being expansion spring means provided in said sleeve and having end portions respectively abutting against said end wall and against the larger diameter portion of said sealing member for biasing said sealing member in a direction toward said tip.

5. An anchoring arrangement as set forth in claim 1, wherein said sealing member is provided with an annular inwardly extending thin flexible sealing lip which surrounds and sealingly engages said anchoring member to provide a seal between said members while simultaneously permitting at least some axial movement of one of said members relative to the other.

References Cited by the Examiner
UNITED STATES PATENTS

| | | | |
|---|---|---|---|
| 100,214 | 2/1870 | Thompson | 151—38 |
| 271,365 | 1/1883 | Rodney | 151—38 X |
| 2,362,664 | 11/1944 | Reed | 85—50 X |
| 2,523,806 | 9/1950 | Bohne | 85—1 |
| 2,592,028 | 4/1952 | Hammitt et al. | 85—50 X |
| 2,761,347 | 9/1956 | McKee | 85—1 |
| 2,983,534 | 5/1961 | Heller et al. | 85—50 X |
| 3,030,997 | 4/1962 | Collins | 151—38 X |
| 3,062,557 | 11/1962 | Underwood | 85—1 |

FOREIGN PATENTS

| | | |
|---|---|---|
| 1,072,105 | 3/1954 | France. |
| 1,240,813 | 8/1960 | France. |
| 1,292,642 | 3/1962 | France. |
| 391,668 | 5/1933 | Great Britain. |

OTHER REFERENCES
Sheet Metal Worker; page 67; February 1948.

EARL J. WITMER, *Primary Examiner.*